US010974759B2

(12) United States Patent
Kitazume

(10) Patent No.: US 10,974,759 B2
(45) Date of Patent: Apr. 13, 2021

(54) ELECTRIC POWER STEERING APPARATUS

(71) Applicant: NSK Ltd., Tokyo (JP)

(72) Inventor: Tetsuya Kitazume, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/311,757

(22) PCT Filed: Apr. 9, 2018

(86) PCT No.: PCT/JP2018/014851
§ 371 (c)(1),
(2) Date: Dec. 20, 2018

(87) PCT Pub. No.: WO2019/026351
PCT Pub. Date: Feb. 7, 2019

(65) Prior Publication Data
US 2021/0061344 A1 Mar. 4, 2021

(30) Foreign Application Priority Data
Aug. 2, 2017 (JP) .............................. JP2017-149731

(51) Int. Cl.
B62D 6/00 (2006.01)
B62D 6/10 (2006.01)
(Continued)

(52) U.S. Cl.
CPC ............. *B62D 1/286* (2013.01); *B62D 6/007* (2013.01); *B62D 15/025* (2013.01)

(58) Field of Classification Search
None
See application file for complete search history.

(56) References Cited

U.S. PATENT DOCUMENTS

2001/0054519 A1* 12/2001 Nishiwaki .............. B62D 1/286
180/167
2009/0266641 A1* 10/2009 Ehara ................... B62D 5/0466
180/446
(Continued)

FOREIGN PATENT DOCUMENTS

JP 11-245832 A 9/1999
JP 2001-039325 A 2/2001
(Continued)

OTHER PUBLICATIONS

International Preliminary Report on Patentability of PCT/JP2018/014851 dated Aug. 27, 2018.
(Continued)

*Primary Examiner* — Peter D Nolan
*Assistant Examiner* — Ce Li Li
(74) *Attorney, Agent, or Firm* — Sughrue Mion, PLLC

(57) ABSTRACT

[Problem] An object of the present invention is to provide a high-performance electric power steering apparatus that can smoothly switch a steering control mode with a simple structure and does not make a driver uncomfortable when the driver steers a handle in an automatic steering control. [Means for Solving the Problem] The present invention is the electric power steering apparatus that has a function, which switches between a manual steering control which drives a motor by the first motor current command value calculated based on at least a steering torque and an automatic steering control which drives the motor by the second motor current command value calculated at a steering angle control section so that an actual steering angle follows-up a target steering angle, comprising: a target steering angle correcting section that performs a calculation process for the steering torque depending on a steering state and vehicle speed and outputs a target steering angle correction value, and a correction outputting section that corrects the target
(Continued)

steering angle by using the target steering angle correction value and inputs a corrected correction target steering angle into the steering angle control section.

16 Claims, 12 Drawing Sheets

(51) Int. Cl.
    *B62D 5/04*     (2006.01)
    *B62D 1/28*     (2006.01)
    *B62D 15/02*     (2006.01)

(56) References Cited

U.S. PATENT DOCUMENTS

| | | | | |
|---|---|---|---|---|
| 2014/0019008 A1* | 1/2014 | Nakamura | B62D 6/00 | 701/42 |
| 2015/0191199 A1* | 7/2015 | Tsubaki | B62D 15/025 | 701/42 |
| 2015/0191200 A1* | 7/2015 | Tsubaki | B62D 6/002 | 701/42 |
| 2015/0344066 A1* | 12/2015 | Tsubaki | B62D 6/08 | 701/41 |
| 2015/0353125 A1* | 12/2015 | Tsubaki | B62D 6/02 | 701/42 |
| 2016/0001810 A1* | 1/2016 | Tsubaki | B62D 6/08 | 701/42 |
| 2017/0088166 A1* | 3/2017 | Kunihiro | B62D 5/0463 | |
| 2017/0247048 A1* | 8/2017 | Namikawa | B62D 5/0463 | |
| 2017/0297614 A1* | 10/2017 | Minaki | B62D 6/08 | |
| 2018/0029633 A1* | 2/2018 | Tsubaki | B62D 1/286 | |
| 2018/0186406 A1* | 7/2018 | Itou | B62D 5/0463 | |

FOREIGN PATENT DOCUMENTS

| | | |
|---|---|---|
| JP | 2002-002519 A | 1/2002 |
| JP | 4057955 B2 | 3/2008 |
| JP | 2015-093569 A | 5/2015 |
| WO | 2014/162769 A1 | 10/2014 |
| WO | 2017/002570 A1 | 1/2017 |

OTHER PUBLICATIONS

International Search Report of PCT/JP2018/014851 dated Jun. 26, 2018.

* cited by examiner

PRIOR ART

PRIOR ART

ELECTRIC POWER STEERING APPARATUS

CROSS REFERENCE TO RELATED APPLICATIONS

This application is a National Stage of International Application No. PCT/JP2018/014851 filed Apr. 9, 2018, claiming priority based on Japanese Patent Application No. 2017-149731 filed Aug. 2, 2017.

TECHNICAL FIELD

The present invention relates to an electric power steering apparatus that has a switch function between an automatic steering control mode (a steering angle control mode of a parking assist and so on) and a manual steering control mode (an assist control mode) in a steering control of a vehicle, drives a motor by means of a motor current control value and applies an assist force to a steering system of the vehicle, and in particular to the electric power steering apparatus that corrects a target steering angle value of the steering control in the automatic steering control mode to a direction to which the steering torque is applied, and improves a steering feeling of a driver in a state that the steering torque does not reach a switch threshold, by variably changing a correction amount depending on a vehicle speed and a steering state.

BACKGROUND ART

An electric power steering apparatus (EPS) which provides a steering system of a vehicle with a steering assist torque (an assist torque) by means of a rotational torque of a motor, applies the steering assist torque to a steering shaft or a rack shaft by means of a transmission mechanism such as gears or a belt through a reduction mechanism. In order to accurately generate the assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of a duty of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a steering angle sensor 14 for detecting a steering angle θr of the handle 1 and a torque sensor 10 for detecting a steering torque Th of the handle 1, and a motor 20 for assisting a steering force of the handle 1 is connected to the column shaft 2 through the reduction gears 3. The electric power is supplied to a control unit (ECU) 30 for controlling the electric power steering apparatus from a battery 13, and an ignition key signal IG is inputted into the control unit 30 through an ignition key 11. The control unit 30 calculates a current command value of an assist control on the basis of a steering torque Th detected by the torque sensor 10 and a vehicle speed Vs detected by a vehicle speed sensor 12, and controls a current supplied to the motor 20 by means of a voltage control command value Vref obtained by performing a compensation or the like to the current command value. As well, although the steering angle θr is detected from the steering angle sensor 14, it is possible to obtain the steering angle from a rotational sensor being connected to the motor 20.

A controller area network (CAN) 40 to send/receive various information and signals on the vehicle is connected to the control unit 30, and it is also possible to receive the vehicle speed Vs from the CAN 40. Further, a Non-CAN 41 is also possible to connect to the control unit 30, and the Non-CAN 41 sends and receives a communication, analogue/digital signals, electric wave or the like except for the CAN 40.

The control unit 30 mainly comprises a CPU (Central Processing Unit) (including an MPU (Micro Processor Unit) and an MCU (Micro Controller Unit)), and general functions performed by programs within the CPU are, for example, shown in FIG. 2.

The control unit 30 will be described with reference to FIG. 2. The steering torque Th detected from the torque sensor 10 and the vehicle speed Vs detected from the vehicle speed sensor 12 (or from the CAN) are inputted into a current command value calculating section 31 which calculates a current command value Iref1. The current command value calculating section 31 calculates a current command value Iref1 which is a current control target value supplied to the motor 20, based on the inputted steering torque Th and the vehicle speed Vs using an assist map or the like. The current command value Iref1 is inputted into a current limiting section 33 via an adding section 32A. The current command value Iref3 whose maximum current is limited by an overheat protecting condition, is inputted into a subtracting section 32B. A deviation Iref4 (=Iref3−Im) which a fed-back motor current value Im is subtracted from the current command value Iref3 is calculated at the subtracting section 32B, and the deviation Iref4 is inputted into a proportional-integral (PI)-control section 35 for improving characteristics in a steering operating. The voltage control command value Vref whose characteristics are improved at the PI-control section 35 is inputted into a PWM-control section 36. Further, the motor 20 is PWM-driven via an inverter 37 as a driving section. The motor current value Im is detected by a motor current detector 38 and is fed-back to the subtracting section 32B.

The rotational sensor 21 such as a resolver is connected to the motor 20 and an actual steering angle θs is detected. A compensation signal CM from a compensating section 34 is added at the adding section 32A. A compensation of the system is performed by adding the compensation signal CM, and a convergence, an inertia characteristic, and the like are improved. The compensating section 34 adds a self-aligning torque (SAT) 343 to an inertia 342 at an adding section 344. The added result is further added with a convergence 341 at an adding section 345. The added result at the adding section 345 is treated as the compensation signal CM.

In such an electric power steering apparatus, vehicles that have an automatic steering control mode (a steering angle control mode of a parking assist and so on) and a manual steering control mode (an assist control mode), and have a switch function between the automatic steering control mode and the manual steering control mode have emerged in recent years. In a case of realizing the automatic steering, generally, the vehicles have a steering angle control and an assist control independently, and have a configuration having a switch function between the outputs of the steering angle control and the assist control. In the steering angle control, a position and velocity control having an excellent performance in a response and an external disturbance suppression is used. The positional control is constituted by a proportional-control (a P-control), and the velocity control is constituted by a proportional-integral-control (a PI-control) or the like.

The general electric power steering apparatus that comprises the functions of the steering angle control mode and the assist control mode, and has a function which the steering control mode is switched, will be described with reference to FIG. 3. A rotational sensor 151 such as a resolver for detecting a motor rotational angle θs is connected to the motor 150. The motor 150 is driving-controlled via a vehicle-side electronic control unit (ECU) 130 and an electric power steering (EPS)-side electronic control unit (ECU) 140. The vehicle-side ECU 130 comprises a switch command section 131 that outputs a switch command SW indicating the steering angle control mode or the assist control mode, based on a button, a switch, and the like which an intension of a driver is indicated, and a target steering angle generating section 132 that generates a target steering angle θt, based on signals from such as a camera (an image) and a laser radar. The actual steering angle θr, which is detected by the steering angle sensor 14 provided with the column shaft (the steering shaft or the handle shaft), is inputted into a steering angle control section 200 in the EPS-side ECU 140 via the vehicle-side ECU 130.

The switch command section 131 outputs the switch command SW, based on a signal which identifies a switching to the steering angle control mode, for example, by using the button and the switch which are provided with a dashboard or the vicinity of the handle and indicate the intension of the driver, or a vehicle status signal which indicates a parking mode and the like by using a shift lever. The switching command SW is inputted into a switching section 142 in the EPS-side ECU 140. The target steering angle generating section 132 generates the target steering angle θt by using a known method, based on data from such as the camera (the image) and the laser radar, and inputs the generated target steering angle θt into the steering angle control section 200 in the EPS-side ECU 140.

The EPS-side ECU 140 comprises an assist control section 141 that outputs an assist control command value Itref calculated based on the steering torque Th and the vehicle speed Vs, a steering angle control section 200 that calculates and outputs a steering angle control command value Imref for the steering angle control based on the target steering angle θt, the actual steering angle θr and a motor angular velocity ωr, a switching section 142 that switches between the assist control command value Itref and the steering angle control command value Imref by means of the switch command SW, a current control/driving section 143 that driving-controls the motor 150 based on a motor current command value Iref (=Itref or Imref) from the switching section 142 and a motor angular velocity calculating section 144 that obtains the motor velocity based on the motor rotational angle θs from the rotational sensor 151 and calculates the actual angular velocity ωr by using the motor velocity and the gear ratio. The motor angular velocity calculating section 144 includes a low pass filter (LPF), for reducing a high frequency noise, that is disposed at a rear stage of a calculation corresponding to the differential.

As shown in FIG. 4, the steering angle control section 200 comprises a position control section 210 that outputs a steering angular velocity command value ωc so that the actual steering angle θr follows-up the target steering angle θt, and a velocity control section 220 that outputs a steering angle control command value Imref so that the actual steering angular velocity ωr follows-up the steering angular velocity command value ωc. The switching section 142 switches between the assist control mode (the manual steering control) by using the assist control section 141 and the steering angle control mode (the position/velocity control mode) by using the steering angle control section 200, outputs the assist control command value Itref in the assist control mode and outputs the steering angle control command value Imref in the steering angle control mode based on the switch command SW from the switch command section 131 in the vehicle-side ECU 130.

In the electric power steering apparatus having such a function, in conventional, a reverse parking or a parallel parking is automatically performed by controlling an actuator (the motor) based on a relationship between a running distance of the vehicle and the steering angle, which is in advance stored. The conventional steering control apparatus calculates the motor current command value so that the actual steering angle is coincident with the target steering angle which is set depending on the vehicle, resulting in realizing the automatic steering control. For example, in the automatic steering apparatus described in Japanese Patent No. 4057955 B2 (Patent Document 1), when the steering control mode is switched from the steering angle control to the torque assist control, uncomfortable feeling of the driver when the steering control is switched, is reduced by changing a fade transition time depending on the assist torque amount.

THE LIST OF PRIOR ART DOCUMENTS

Patent Documents

Patent Document 1: Japanese Patent No. 4057955 B2
Patent Document 2: Japanese Unexamined Patent Publication No. 2015-93569 A

SUMMARY OF THE INVENTION

Problems to be Solved by the Invention

During the automatic steering control of the electric power steering apparatus being capable of performing the automatic steering that the actual steering angle follows-up the target steering angle, in a case that the steering wheel maneuvering by the driver is judged, it is preferred that the automatic control is stopped and the steering control mode smoothly is switched to the assist control of the manual steering control. Even during the steering angle control, in a case that the steering torque does not reach the threshold that the steering wheel maneuvering by the driver is judged, it is preferred that the steering angle control that the driver hardly feels the uncomfortable feeling for the steering operation is continued.

The automatic steering control performs the control so that the actual steering angle is coincident with the target steering angle. In a case that the driver operates the steering mechanism and applies the steering torque to the steering mechanism, the actual steering angle is deviated from the target steering angle. Thus, the motor current command value having a component in the inverse direction to the steering torque so that the actual steering angle is coincident with the target steering angle and the automatic steering control acts against the applied steering torque, is outputted.

On the contrary, in the assist control, the motor current command value having the component in the same direction so as to assist the steering torque, is outputted. Accordingly, when the steering control mode is switched from the automatic steering control, in a case that the steering torque is applied, to the manual steering control, the output in the automatic steering control is mutually inverse to the output in the manual steering control. Therefore, the driver feels that, from the application of the steering torque to the steering mechanism, the steering control mode is gradually switched to the manual steering control due to the fade process after the assist in the inverse direction for the steering torque is temporarily performed by the automatic steering control. In other words, finally, the assist in the same direction to the applied steering torque is performed. Because of this phenomenon, the driver feels the catching feeling and the uncomfortable feeling when the steering control mode is switched from the automatic steering control to the manual steering control. Further, when the applied steering torque is equal to or less than the threshold that the steering control mode is switched to the assist control (the manual steering control), since the output in the steering angle control follows-up the target steering angle against the steering of the driver, the driver cannot freely steer the handle.

Japanese Unexamined Patent Publication No. 2015-93569 A (Patent Document 2) discloses the steering control apparatus that the steering angle deviation is coincident with a physical value of the deviation between the target steering torque and the steering torque, the rate of the deviation between the target steering torque and the steering torque to the steering angle deviation is changed depending on the steering intervention, the corrected deviation between the target steering torque and the steering torque is added to the corrected steering angle deviation, and the steering intervention of the driver is reflected to the target value so that the added deviation becomes a smaller value. Patent Document 2 reflects the steering intervention of the driver to the target value. However, since the weights to the assist deviation and the following-up deviation are set, a unit of the assist deviation is coincident with that of the following-up deviation, and the converted assist deviation is added to the converted following-up deviation in accordance with the weights, the control system becomes complicate. Further, since the dynamic steering of the driver is not considered in the above configuration, it is difficult to set the dynamic steering characteristics.

The present invention has been developed in view of the above-described circumstances, and an object of the present invention is to provide the high-performance electric power steering apparatus that can smoothly switch the steering control mode with a simple structure and does not make the driver uncomfortable when the driver steers the handle in the automatic steering control.

Means for Solving the Problems

The present invention relates to an electric power steering apparatus that has a function, which switches between a manual steering control which drives a motor by a first motor current command value calculated based on at least a steering torque and an automatic steering control which drives the motor by a second motor current command value calculated at a steering angle control section so that an actual steering angle follows-up a target steering angle, the above-described object of the present invention is achieved by that: comprising a target steering angle correcting section that performs a calculation process for the steering torque depending on a steering state and a vehicle speed and outputs a target steering angle correction value, and a correction outputting section that corrects the target steering angle by using the target steering angle correction value and inputs a corrected correction target steering angle into the steering angle control section.

The above-described object of the present invention is efficiently achieved by that: wherein the target steering angle correcting section comprises a phase compensating section that performs a phase lead compensation or a phase delay compensation to the steering torque based on the steering state, a dead band gain section that inputs a first compensation steering torque from the phase compensating section, has a dead band at a region which the first compensation steering torque is small, and outputs a second compensation steering torque which increases in a same direction as an increasing direction of the first compensation steering torque depending on the vehicle speed, and a limiter that limits an upper limit value and a lower limit value of the second compensation steering torque depending on the vehicle speed, and outputs the correction target steering angle; or wherein a second phase compensating section is disposed at a rear stage of the dead band gain section; or wherein the target steering angle correcting section comprises a dead band gain section that inputs the steering torque, has a dead band at a region which the steering torque is small, and outputs a first compensation steering torque which increases in a same direction as an increasing direction of the steering torque depending on the vehicle speed, a phase compensating section that performs a phase lead compensation or a phase delay compensation to the first compensation steering torque based on the steering state, and a limiter that limits an upper limit value and a lower limit value of a second compensation steering torque from the phase compensating section depending on the vehicle speed, and outputs the correction target steering angle; or wherein a second phase compensating section is disposed at a front stage of the dead band gain section; or wherein an output gain of the dead band gain section is smaller as the vehicle speed is higher; or wherein a limit value of the limiter is smaller as the vehicle speed is higher; or wherein the dead band is variably changed depending on the vehicle speed; or wherein the steering state is a steering-forward maneuver or a steering-backward maneuver of a handle; or wherein a judgment of the steering-forward maneuver and the steering-backward maneuver is performed based on a relationship between the actual steering angle and a motor angular velocity, or a relationship between the actual steering angle and a steering angular velocity, or a relationship between the steering torque and a steering angular velocity, or a relationship between the steering angular velocity and a deviation between the target steering angle and the actual steering angle, or a relationship between a deviation between a change rate of the target steering angle and the steering angular velocity and a deviation between the target steering angle and a steering angle; or wherein the correction outputting section is an adding section.

Effects of the Invention

According to the electric power steering apparatus of the present invention, the steering control of the handle is performed in the automatic steering control such as the parking assist or the automatic running. When the steering torque is applied by the driver, the target steering angle is corrected in the direction to which the steering torque is applied, the steering angle control is performed so that the actual steering angle is coincident with the corrected target steering angle, and the correction amount is variably changed depending on the vehicle speed and the steering state. Thereby, in a case that the result which is multiplied the output of the assist control with a certain rate is added to the result which is multiplied the output of the steering control to the corrected target steering angle with a certain rate and the control is performed by using the added value, since the direction of the output of the automatic steering control can be coincident with that of the manual steering control and the interference by the respective control outputs hardly occurs, the uncomfortable feeling to the driver when the steering control mode is switched, can be reduced. Since the steering feeling can be improved when the steering torque does not reach the switch threshold, an improvement in safety to the driver is also achieved.

Further, since the sharp correction of the target steering angle is smoothed and is controlled in the present invention, the driver does not have the anxious feeling in the automatic driving.

BRIEF DESCRIPTION OF THE DRAWINGS

In the accompanying drawings.

MODE FOR CARRYING OUT THE INVENTION

Figure 1:
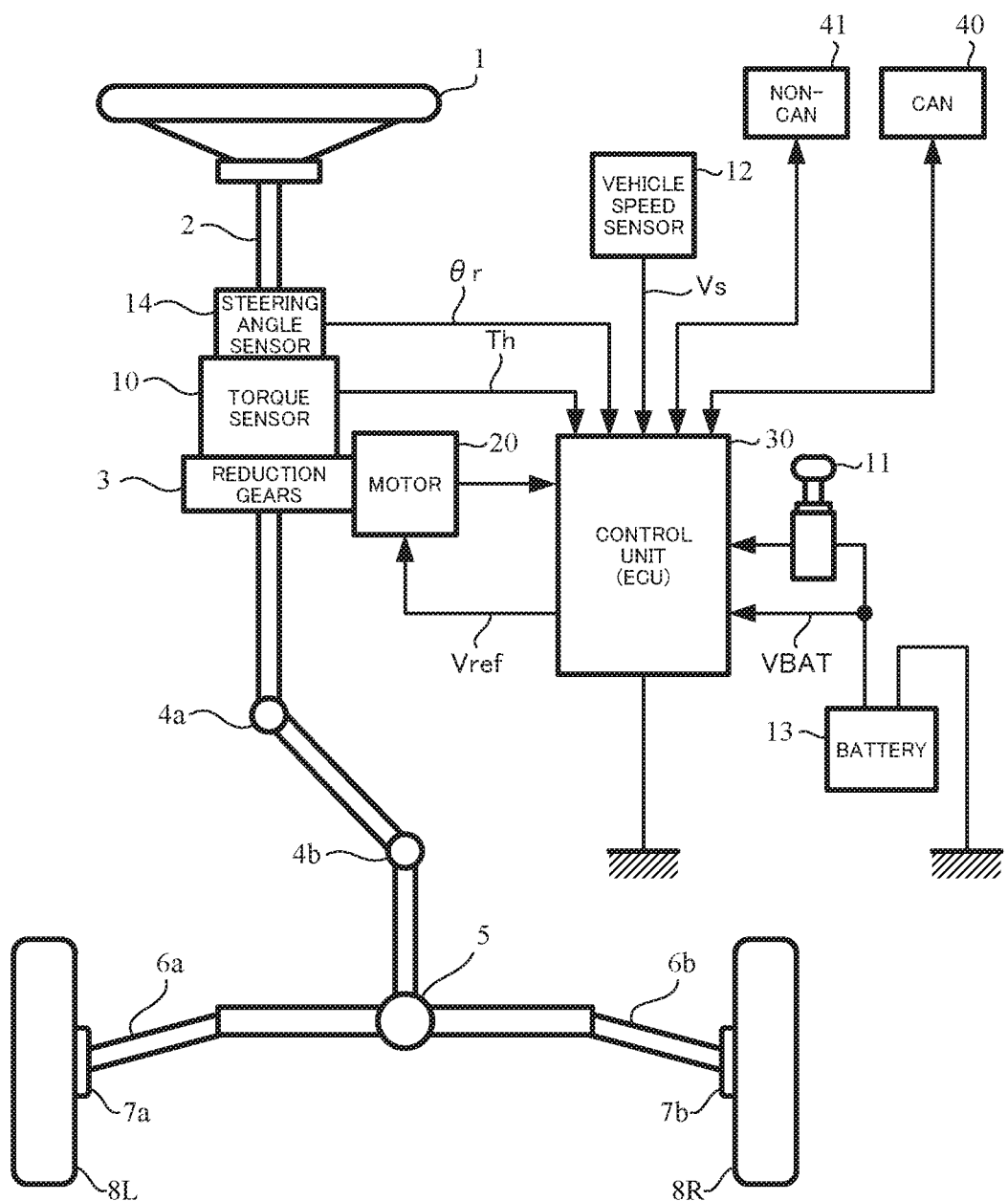
FIG. 1 is a configuration diagram illustrating a general outline of an electric power steering apparatus.
Figure 2:
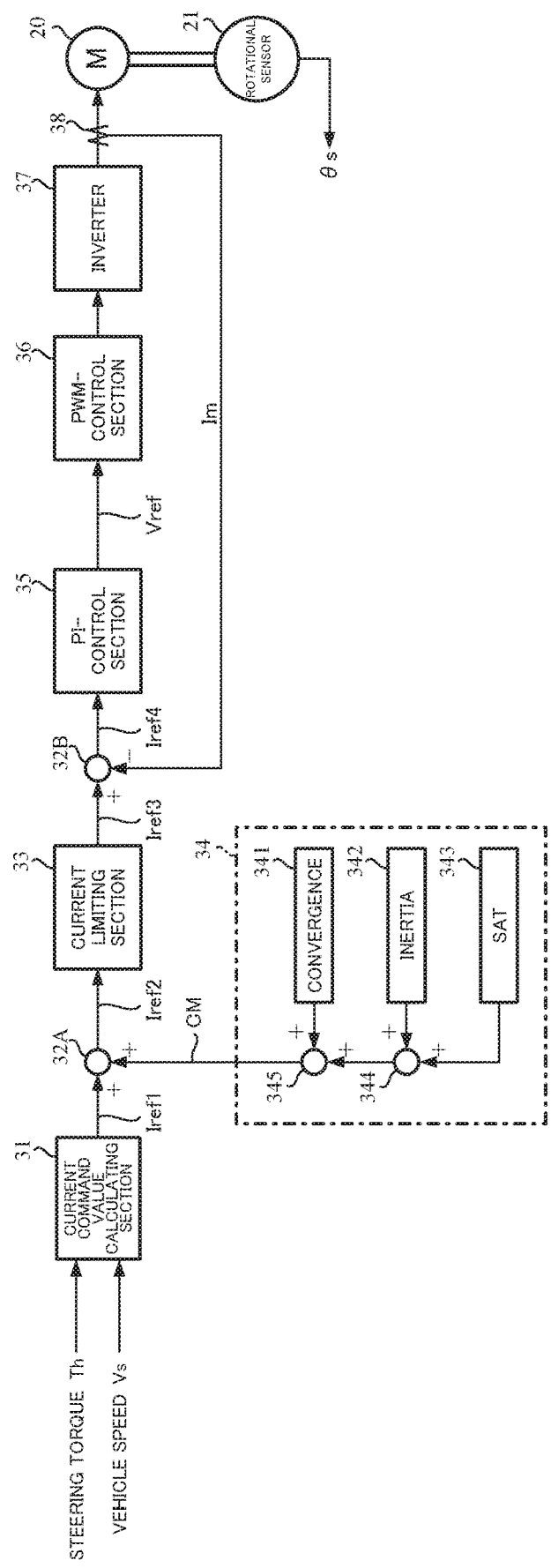
FIG. 2 is a block diagram showing a general configuration example of a control system of the electric power steering apparatus.

In the present invention, when a steering torque from a driver is applied, a target steering angle is corrected in a direction to which the steering torque is applied, and steering angle control is performed so that an actual steering angle is coincident with the corrected target steering angle. Further, by variably setting a correction amount in a correcting section depending on vehicle speed, it is possible that the correction amount is appropriately set depending on a change of the vehicle characteristics due to the vehicle speed. A gradient (a gain) of the correction amount for the torque is set a smaller value as the vehicle speed is higher. In order not to excessively correct the correction amount, the correction amount in the correcting section is limited by a limit value that the correction amount is smaller as the vehicle speed is higher.

In the present invention, in addition to the above configuration, a phase compensating section is disposed at a front stage or a rear stage of a gain section having a dead band, or the phase compensating sections are disposed at both the front stage and the rear stage of the gain section having the dead band, and a phase compensation characteristic in the phase compensating section is changed when the handle is steered-forward and steered-backward. Thereby, in a case that the driver steers the handle (the steering wheel) in a range that the steering angle control is not stopped, the driver can deflect the vehicle within a range of the correction amount limit value. The limiter is disposed for preventing from the excessive vehicle deflection by the driver during the automatic driving. Even when a steering control mode is switched from the steering angle control to the assist control, since the control is performed by mutually adding, with certain rates, an output of the steering control for the corrected target steering angle and an output of the assist control due to the steering torque, the direction of the output of the steering angle control can be coincident with that of the assist control, the interference by the respective control outputs hardly occurs, and uncomfortable feeling to the driver when the steering control mode is switched, can be reduced.

Further, since a difference between the correction amount in a steering-forward maneuver and that in a steering-backward maneuver is generated by switching the characteristic of the phase compensating section in the steering-forward maneuver and in the steering-backward maneuver, hysteresis of the steering torque can be variably changed. The dynamic steering characteristic can be adjusted by changing the phase compensation characteristic. For example, in a case that the phase delay is set in the steering-forward maneuver, since the correction amount to the change of the steering torque is delayed, the steering torque becomes larger during the steering-forward maneuver and the hysteresis can be wider. In a case that the phase delay of the phase compensating section is large, since the correction with the steering torque is delayed, the steering torque becomes larger in comparison with a case that the phase delay is small. For example, in a case that the hysteresis is set to a larger value, compared with the phase characteristic in the steering-backward maneuver, the phase characteristic in the steering-forward maneuver is set to be the phase delay. Accordingly, compared with not switching the characteristic of the phase compensating section, the hysteresis width in the steering maneuver can be set wider. Setting the wide hysteresis can adjust the steering feeling and it has an advantage that the characteristic of the phase compensating section is not excessively reacted against torque variation due to the disturbance from a road surface and the change of the steering angle control amount.

Embodiments according to the present invention will be described with reference to the drawings in detail.

Figure 3:
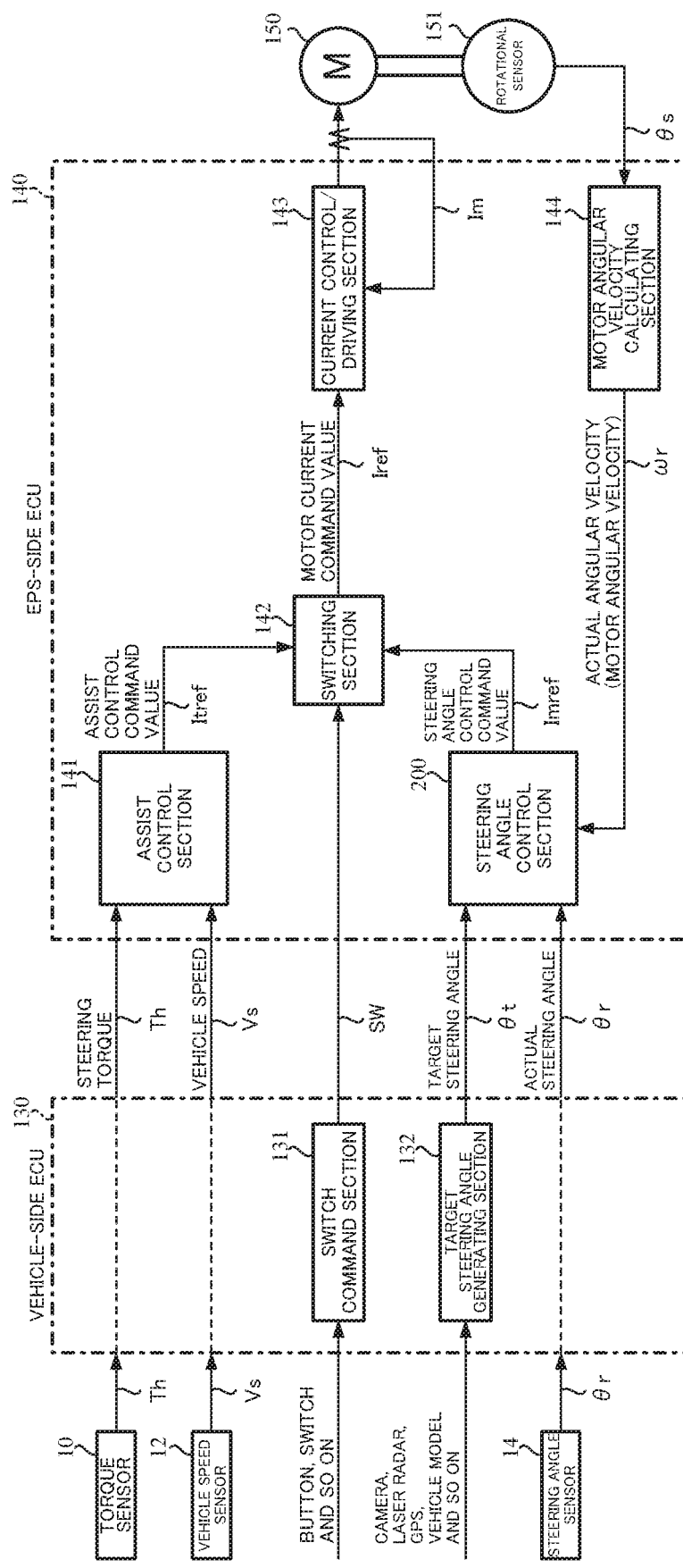
FIG. 3 is a block diagram showing an example of the electric power steering apparatus having a switch function between an automatic steering control mode and a manual steering control mode.
Figure 4:
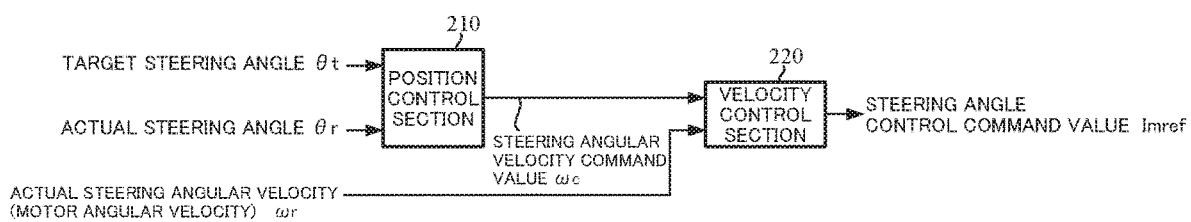
FIG. 4 is a block diagram showing a configuration example of a steering angle control section.
Figure 5:
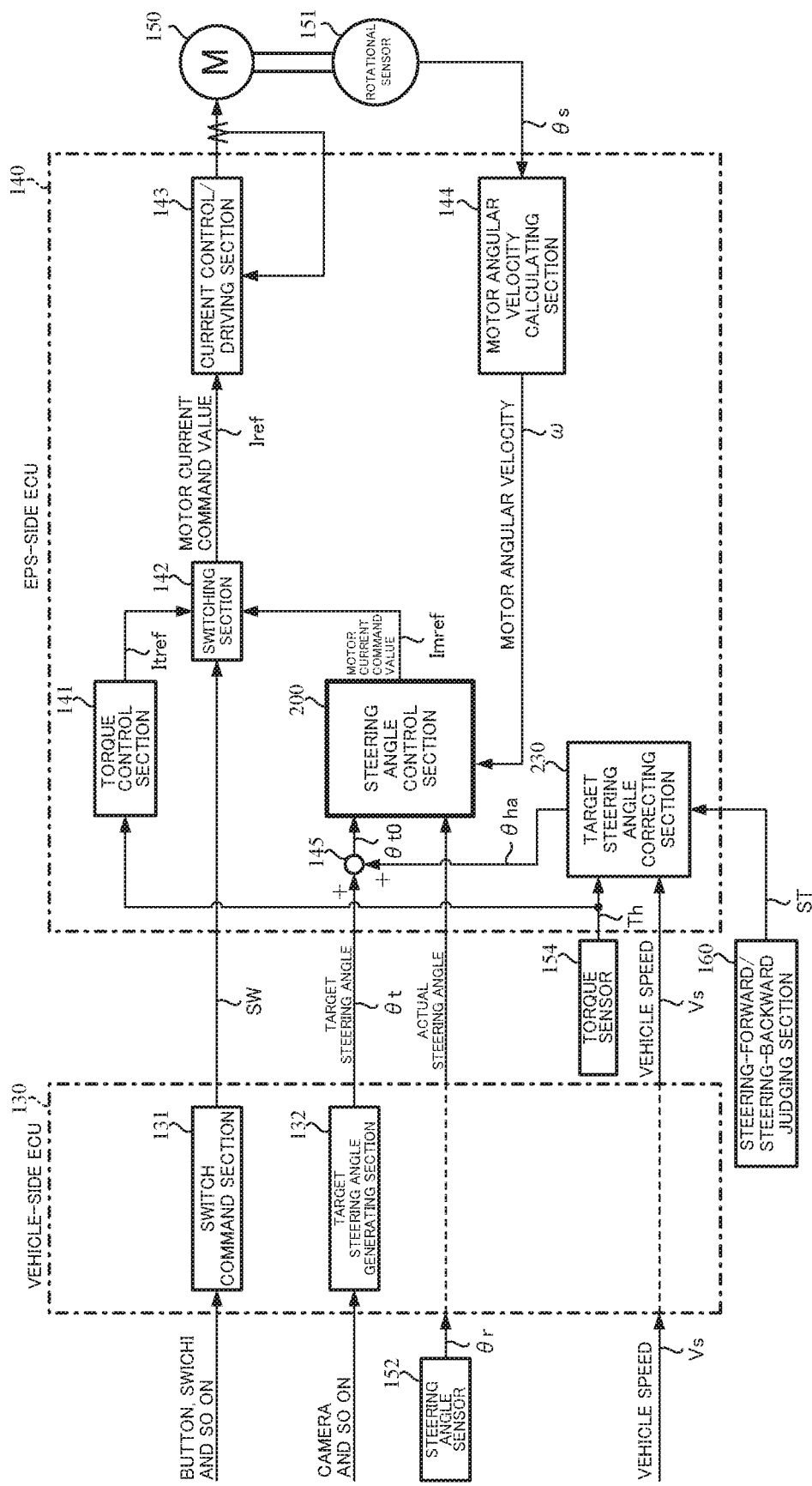
FIG. 5 is a block diagram showing a configuration example of the present invention.

FIG. 5 shows an embodiment of the present invention, corresponding to FIG. 3. A target steering angle correcting section 230 that performs a calculation process for the steering torque Th from the torque sensor 154 depending on a steering state ST from a steering-forward/steering-backward judging section 160 and the vehicle speed Vs and outputs a calculated target steering angle correction value θha, is included. The target steering angle θt is added to the target steering angle correction value θha from the target steering angle correcting section 230 at an adding section 145 and is corrected. A corrected target steering angle θt0 that is corrected at the adding section 145 is inputted into a steering angle control section 200. The steering angle control section 200 inputs an actual steering angle θr and a motor angular velocity ω and outputs a calculated motor current command value Imref.

Figure 6:
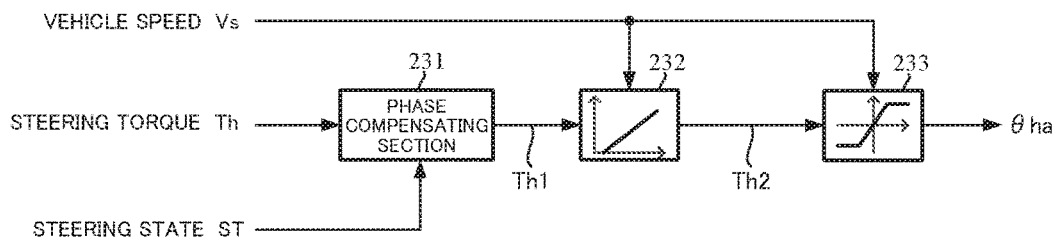
FIG. 6 is a block diagram showing a configuration example (the first embodiment) of a target steering angle correcting section of the present invention.
Figure 7A:
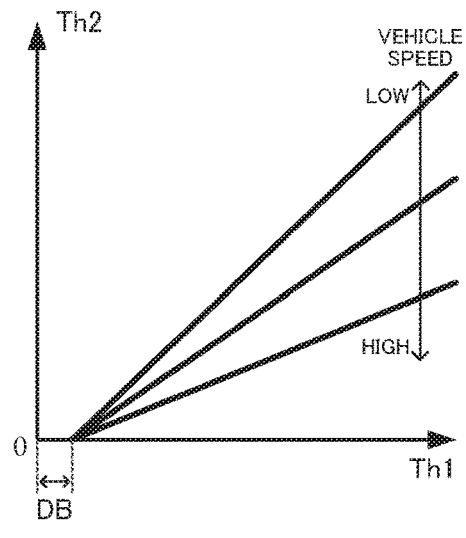
FIGS. 7A, 7B and 7C are characteristic diagrams showing characteristic examples of a dead band gain section.
Figure 7B:
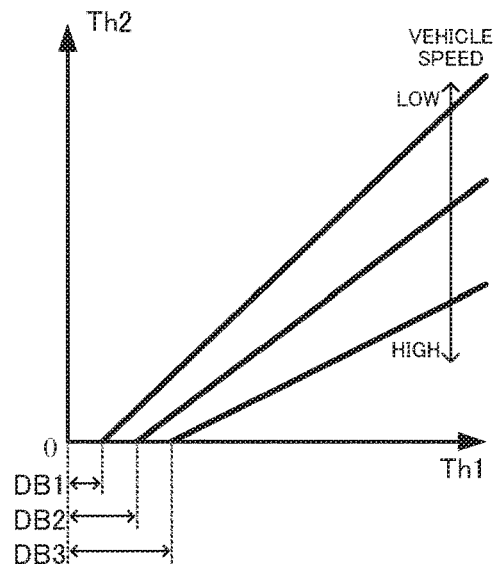
Figure 7C:
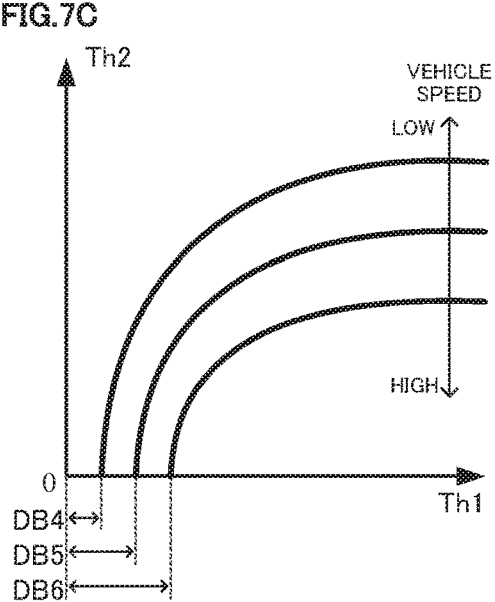

The target steering angle correcting section 230 has a configuration shown in FIG. 6 (the first embodiment), and comprises a phase compensating section 231 that performs a phase lead compensation or a phase delay compensation to the steering torque Th based on the steering state ST, a dead band gain section 232 that inputs a compensation steering torque Th1 from the phase compensating section 231, has a dead band DB in a range that the compensation steering torque Th1 is small shown in FIGS. 7A, 7B and 7C and outputs a compensation steering torque Th2 which increases in the same direction as an increasing direction of the compensation steering torque Th1, and a limiter 233 that limits an upper limit value and a lower limit value of the compensation steering torque Th2 and outputs the target steering angle correction value θha.

The vehicle speed Vs is inputted into the dead band gain section 232, and the dead band gain section 232 has a constant dead band DB and linearly outputs the compensation steering torque Th2 as shown in FIG. 7A. The output gain (the gradient) is smaller as the vehicle speed Vs is higher. That is, the dead band gain section 232 has the dead band DB and outputs the compensation steering torque Th2 that becomes smaller as the vehicle speed Vs becomes higher. FIG. 7A is an example that the dead band DB is constant and the output gain (the gradient) is linear. As shown in FIG. 7B, the dead band DB may be variably changed depending on the vehicle speed Vs. That is, as the vehicle speed Vs becomes higher, the dead band DB becomes larger as shown by "DB1→DB2→DB3". Although the output gain linearly increases in FIGS. 7A and 7B, the output gain may nonlinearly increase as shown in FIG. 7C. In FIG. 7C, although the dead band (DB4 to DB6) is variably changed depending on the vehicle speed Vs, the dead band may be constant.

Figure 8:
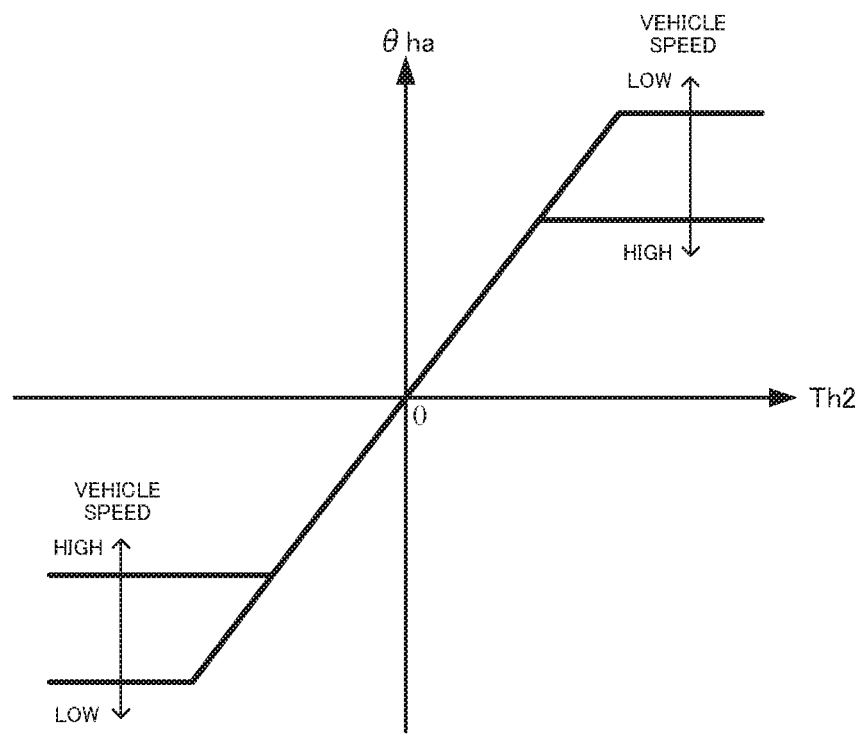
FIG. 8 is a characteristic diagram showing a characteristic example of a limiter.

The vehicle speed Vs is also inputted into the limiter 233, and the limiter 233 has a characteristic that the limit value becomes smaller as the vehicle speed Vs becomes higher, as shown in FIG. 8. That is, the limiter 233 limits an upper limit value and a lower limit value using the smaller limit value as the vehicle speed Vs is higher.

Figure 9:
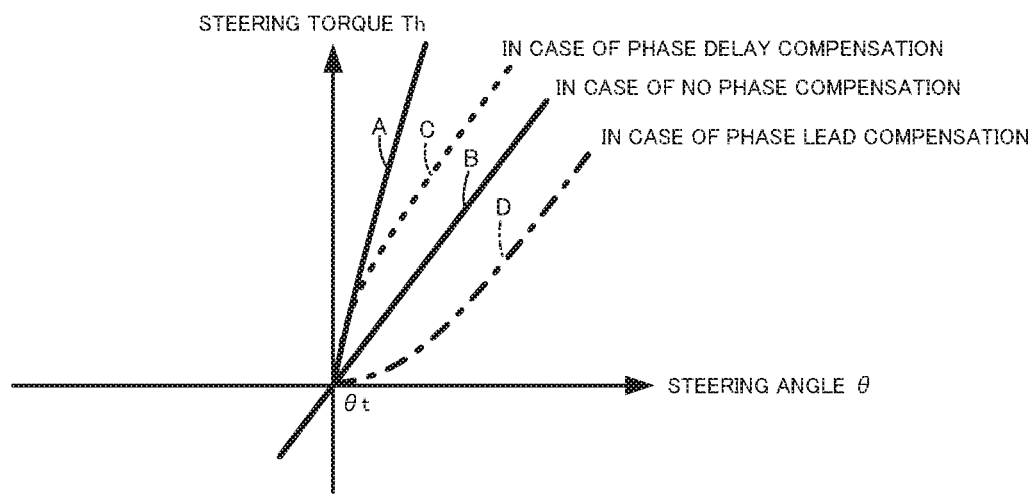
FIG. 9 is a characteristic diagram for explaining phase compensation.

Since a difference between the correction amount in the steering-forward maneuver and that in the steering-backward maneuver is generated by switching the characteristic of the phase compensating section 231 with the steering state ST in the steering-forward maneuver and that in the steering-backward maneuver, it is possible to variably change the hysteresis of the steering torque Th. FIG. 9 shows the respective characteristics of a case of no phase compensation (the characteristic B indicated by a solid line), a case of the phase delay compensation (the characteristic C indicated by a broken line) and a case of the phase lead compensation (the characteristic D indicated by a dashed dotted line). In a case that the phase delay of the phase compensating section 231 is large, since the correction amount for the change of the steering torque Th is delayed, the steering torque becomes large in comparison with a case that the phase delay is small. During the automatic steering, when the driver steers the handle, the torque increases and the handle is returned to the target steering angle θt. Thus, a relationship between the steering angle θ and the steering torque Th is represented by the characteristic A in FIG. 9. By adopting a logic circuit that the target steering angle θt is corrected depending on the torque, it is possible to change the relationship between the steering angle θ and the steering torque Th as shown by the characteristic B. Since the correction is early performed in a case of the phase lead compensation, the relationship between the steering angle θ and the steering torque Th is represented by the characteristic D. Since the correction is delayed in a case of the phase delay compensation, the relationship between the steering angle θ and the steering torque Th is represented by the characteristic C.

Figure 10:
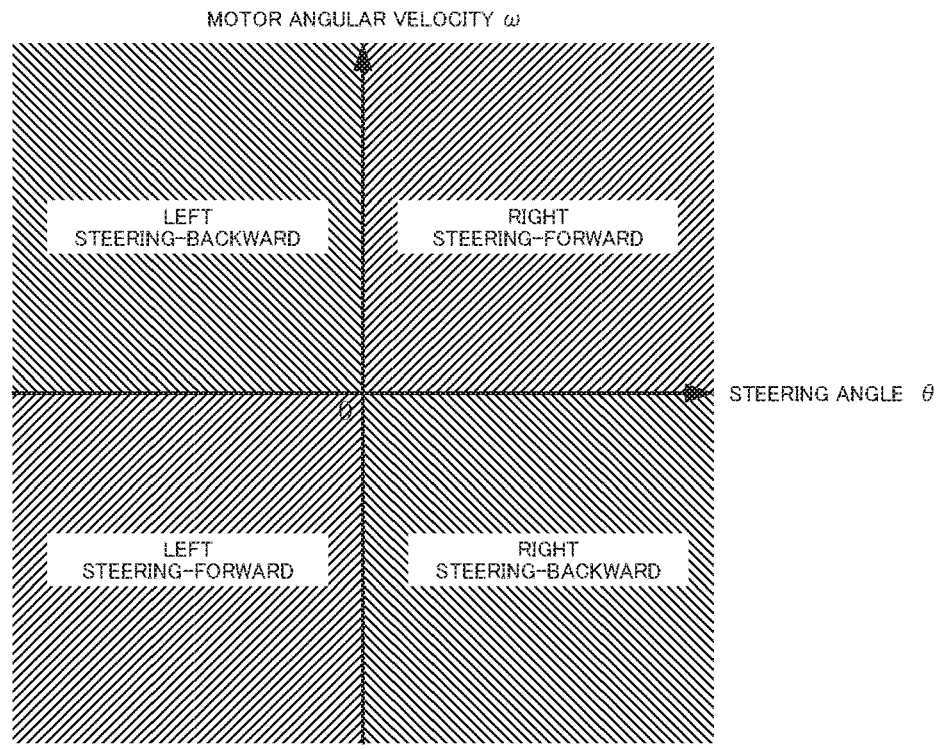
FIG. 10 is a graph showing a judgment example of steering state (steering-forward/steering-backward)

The steering state ST that is inputted into the phase compensating section 231 is judged at the steering-forward/steering-backward judging section 160. For example, as shown in FIG. 10, in a case that the sign of the steering angle θ is the same as that of the motor angular velocity ω, the steering-forward/steering-backward judging section 160 judges that the steering state is the steering-forward maneuver. In a case that the sign of the steering angle θ is different from that of the motor angular velocity ω, the steering-forward/steering-backward judging section 160 judges that the steering state is the steering-backward maneuver. The following combination of the signals may be used in the judgment of the steering-forward maneuver or the steering-backward maneuver. In any combinations, in a case that the signs of the signals are same, the steering-forward/steering-backward judging section 160 judges that the steering state is the steering-forward maneuver. In a case that the signs of the signals are different, the steering-forward/steering-backward judging section 160 judges that the steering state is the steering-backward maneuver. As the above combinations, there are the relationship between the actual steering angle and the motor angular velocity, or the relationship between the actual steering angle and the steering angular velocity, or the judgment by using the steering torque and the steering angular velocity, or the judgment by using the steering angular velocity and a deviation between the target steering angle before the correction and the actual steering angle, or the judgment by using a deviation between a change rate of the target steering angle before the correction and the steering angular velocity and a deviation between the target steering angle before the correction and a steering angle, and so on.

The target steering angle correction value θha that is corrected at the target steering angle correcting section 230 is inputted into an adding section 145 served as a correction outputting section. The corrected target steering angle θt0 (=θt+θha) that the target steering angle θt is corrected at the adding section 145 is inputted into the steering angle control section 200. The steering angle control section 200 calculates the motor current command value Imref and outputs it.

Figure 11:
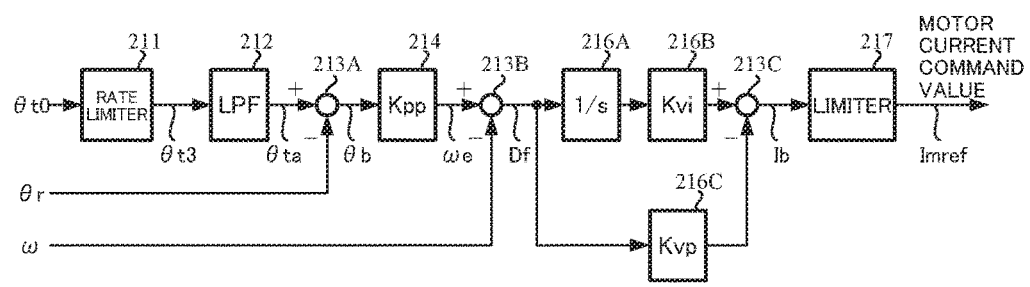
FIG. 11 is a block diagram showing another configuration example showing the steering angle control section.

FIG. 11 shows a configuration example of the steering angle control section 200. The corrected target steering angle θt0 is inputted into a rate limiter 211 that performs smoothing in a case that the corrected target steering angle θt0 from the adding section 145 is sharply changed, that is, smoothly changes the corrected target steering angle θt0 in a range of a predetermined time change rate. The target steering angle θta passing through a low pass filter (LPF) 212 to remove the high frequency disturbance, is adding-inputted into a subtracting section 213A. The actual steering angle θr is subtracting-inputted into a subtracting section 213A, an angle deviation between the smoothed target steering angle θta and the actual steering angle θr is multiplied with a gain Kpp at a proportional gain (Kpp) section 214, and a motor velocity command value ωc, which is the above multiplied result, is adding-inputted into a subtracting section 213B. The motor angular velocity ω from the motor angular velocity calculating section 144 is subtracting-inputted into the subtracting section 213B. A calculated velocity deviation Df passes through an integral section 216A, is multiplied with a gain Kvi at an integral gain section (Kvi) 216B, and is adding-inputted into a subtracting section 213C. The velocity deviation Df is multiplied with a gain Kvp at a proportional gain section (Kvp) 216C, and is subtracting-inputted into the subtracting section 213C. The motor current command value Ib, which is a subtracted result at the subtracting section 213C, passes through the limiter that the upper limit value and the lower limit value are limited, and is outputted as the motor current command value Imref.

Figure 12:
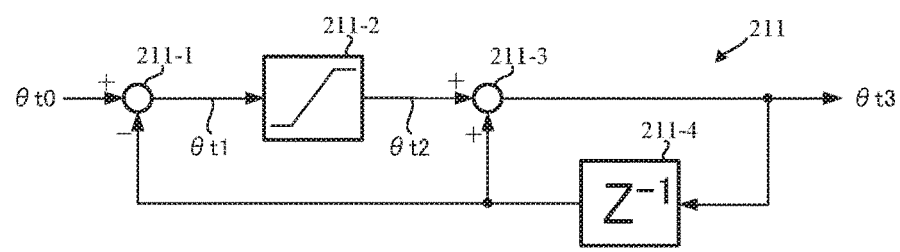
FIG. 12 is a block diagram showing a configuration example of a rate limiter.

In a case that the corrected target steering angle θt0 is sharply changed, the rate limiter 211 smooths the corrected target steering angle θt0 and outputs it. For example, the rate limiter 211 has a configuration shown in FIG. 12. That is, the corrected target steering angle θt0 is adding-inputted into a subtracting section 211-1. A steering angle θt1 that is a subtracted result between the corrected target steering angle θt0 and a previous value from a holding section (Z') 211-4 is inputted into a change amount setting section 211-2. The change amount setting section 211-2 performs an upper and lower limit process to the steering angle θt1, and outputs the processed value as the change amount θt2. An adding section 211-3 adds the previous value to the change amount θt2, and outputs an added result as a new target steering angle θt3. The change amount setting section 211-2 limits the change amount so that the change amount is not beyond the set upper limit value and the set lower limit value. The process that is performed at every calculation period T calculates the difference between the input (the target steering angle) θt0 and the target steering angle θt3 at the previous calculation period, and adds the limited difference θt2 by the upper limit value or the lower limit value to the previous value in a case that the difference is not in a range between the upper limit value and the lower limit value. In a case that the difference is not in a range between the upper limit value and the lower limit value, the above addition process is iteratively performed.

Figure 13:
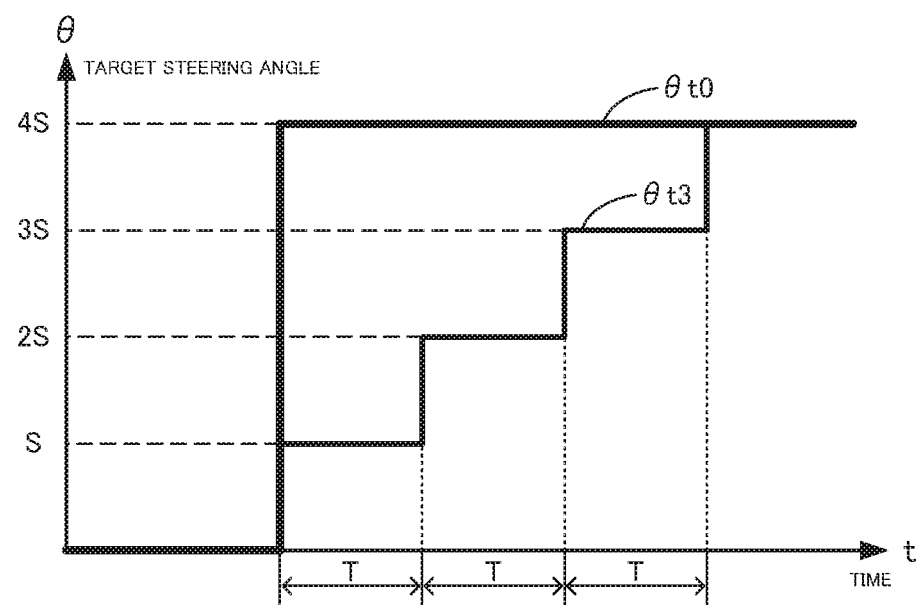
FIG. 13 is a characteristic diagram showing a characteristic example of rate limiter values.

FIG. 13 shows an example of the obtained result due to the above process. Here, the upper limit value sets as "S". Even when the step-shape input (the target steering angle) θt0 whose magnitude is "4S" is inputted, the output θt3 is changed as the step-shape whose magnitude is "S", and finally the output θt3 is coincident with the target steering angle θt0. In a case that the difference between the input (the target steering angle) θt0 and the target steering angle θt3 is in a range between the upper limit value and the lower limit value, the change amount θt2 (=the difference θt1) is outputted, and the change amount θt2 is added to the previous value. As a result, the output θt3 is coincident with the input (the target steering angle) θt0. In FIG. 13, even in a case that the upper limit value is set to "4S" or more, the above process can handle the shape change. As a result, even if the target steering angle θt0 is sharply changed, the target steering angle θt0 that is sharply changed can be smoothly changed by using the above process. The functions that a sharp current change (=abrupt steering) is prevented and the anxious feeling of the automatic driving to the driver is reduced, are performed.

Figure 14:
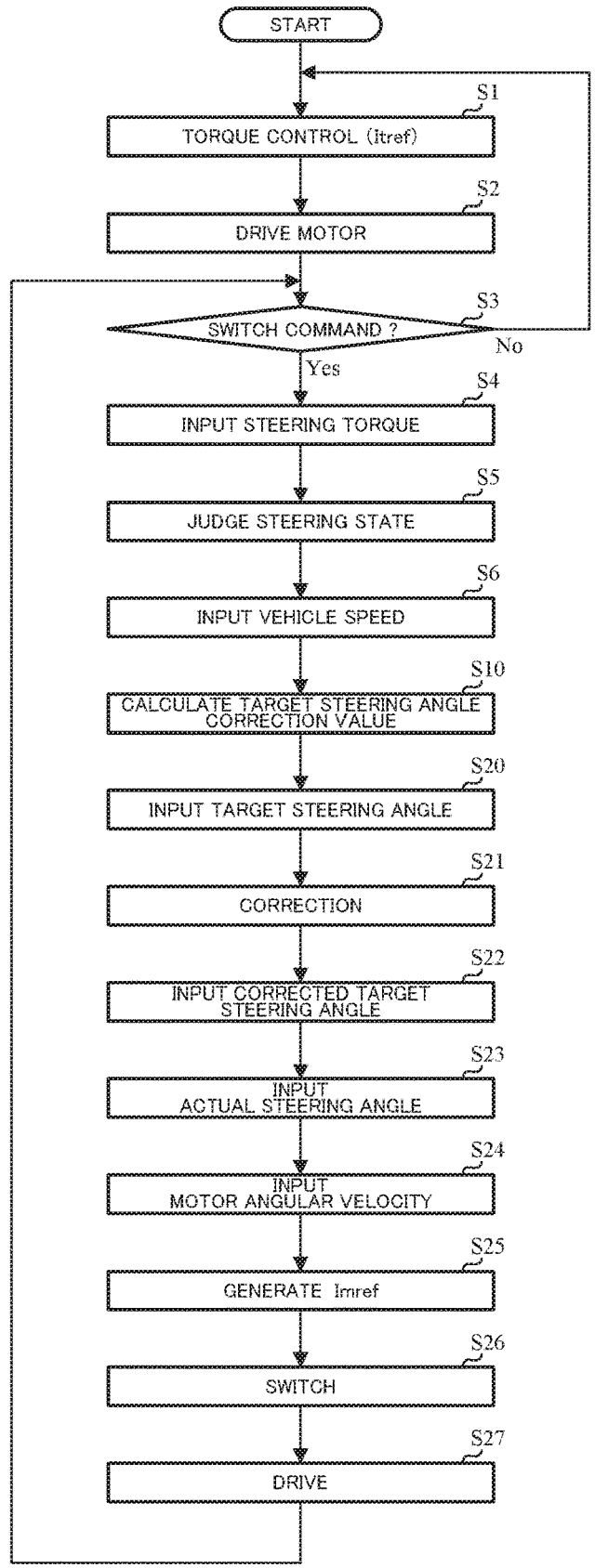
FIG. 14 is a flowchart showing an overall operation example of the present invention.

In such a configuration, an overall operation example will be described with reference to a flowchart of FIG. 14.

When an operation of the steering system is started, the torque control by the torque control section 141 is performed (Step S1) and the motor 150 is driven by a current control/driving section 143 using the motor current command value Itref (Step S2). The above operation is iterated until the switch command SW is outputted from the switch command section 131 (Step S3).

When the steering control mode is switched to the automatic steering control, and the switch command SW from the switch command section 131 is outputted, the steering torque Th is inputted (Step S4), the steering state ST is judged at the steering-forward/steering-backward judging section 160 (Step S5), the vehicle speed Vs is inputted (Step S6), and the target steering angle correction value θha is calculated at the target steering angle correcting section 230 (Step S10).

The target steering angle θt from the target steering angle generating section 132 is inputted (Step S20), the correction is performed by adding the target steering angle correction value θha to the target steering angle θt at the adding section 145 (Step S21), and the corrected target steering angle θt0 that is corrected is inputted into the steering angle control section 200 (Step S22). The actual steering angle θr from the steering angle sensor 152 is inputted (Step S23), the motor angular velocity ω from the motor angular velocity calculating section 144 is inputted (Step S24), and the motor current command value Imref is generated at the steering angle control section 200 (Step S25). Thereafter, the switching section 142 switches the steering control mode with the switch command SW from the switch command section 131 (Step S26), the motor 150 is driven at the current control/driving section 143 using the motor current command value Imref from the steering angle control section 200 (Step S27), and the process is returned to the above Step S3. The driving control by using the motor current command value Imref is iteratively performed until the switch command SW from the switch command section 131 is changed.

Figure 15:
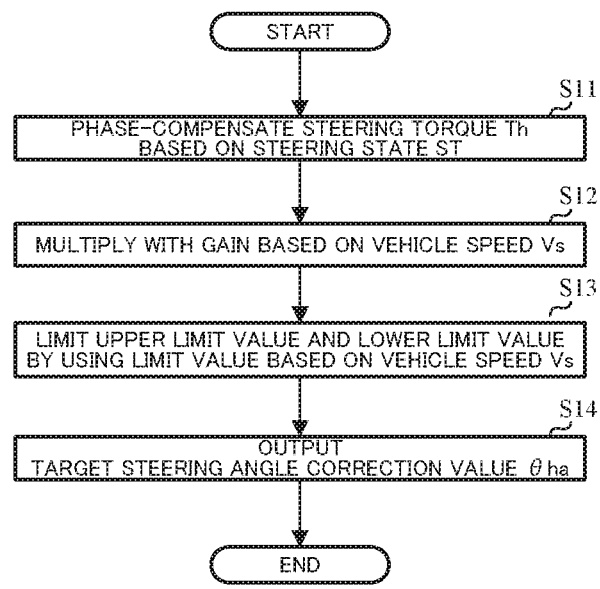
FIG. 15 is a flowchart showing an operation example of the target steering angle correcting section.

Next, the operation example of the target steering angle correcting section 230 (Step S10 of FIG. 14) will described with reference to the flowchart of FIG. 15.

The phase compensating section 231 performs the phase lead compensation or the phase delay compensation for the steering torque Th based on the steering state ST (Step S1), and the compensation steering torque Th1 from the phase compensating section 231 is inputted into the dead band gain section 232 and is multiplied with the gain based on the vehicle speed Vs (Step S12). The compensation steering torque Th2 from the dead band gain section 232 is inputted into the limiter 233, the upper limit value and the lower limit value of the compensation steering torque Th2 are limited by the limit value depending on the vehicle speed Vs (Step S13), and the target steering angle correction value θha that the upper limit value and the lower limit value are limited is outputted (Step S14).

Figure 16:
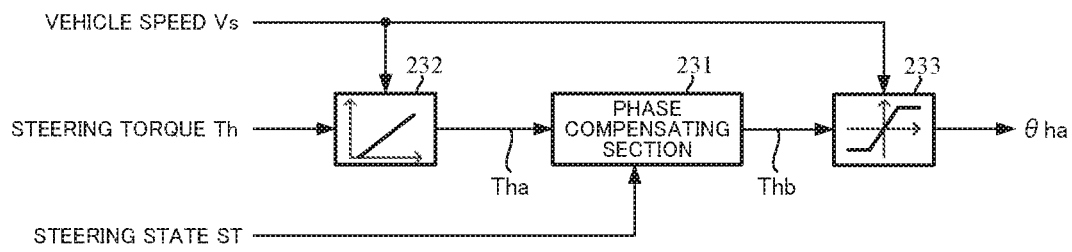
FIG. 16 is a block diagram showing a configuration example (the second embodiment) of the target steering angle correcting section of the present invention.
Figure 17A:
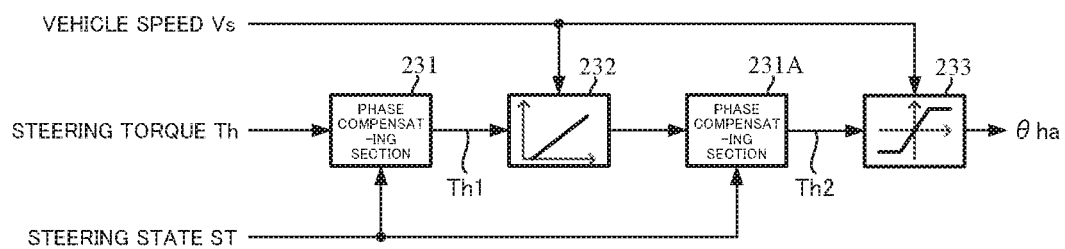
FIGS. 17A and 17B are block diagrams showing other configuration examples (the third and fourth embodiments) of the target steering angle correcting section of the present invention.
Figure 17B:
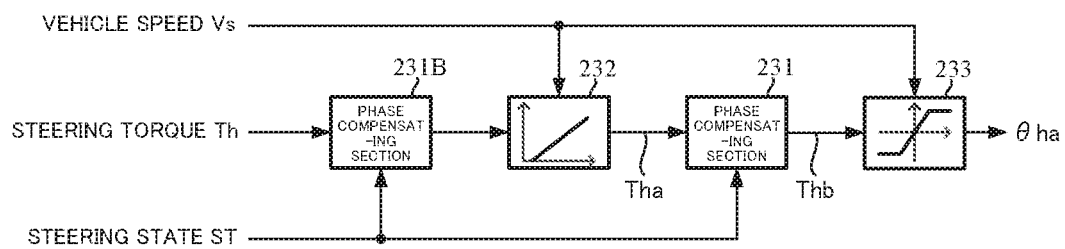

In the target steering angle correcting section 230 of FIG. 6, the compensation steering torque Th1, which is phase-compensated, is inputted into the dead band gain section 232 and is multiplied with the gain. However, as shown in FIG. 16, the steering torque Th is inputted into the dead band gain section 232 and is multiplied with the gain, and then the phase compensating section 231 may perform the phase compensation to the multiplied compensation steering torque (the second embodiment). As shown in FIG. 17A, a second phase compensating section 231A may be disposed at the rear stage of the dead band gain section 232 of the first embodiment shown in FIG. 6 (the third embodiment). In this case, one of the two phase compensating sections 231 and 231A can be mainly used for the target compensation and the other can be used for removing the noise and the like, resulting in obtaining more smooth feeling. Moreover, as shown in FIG. 17B, the second phase compensating section 231B may be disposed at the front stage of the dead band gain section 232 of the second embodiment shown in FIG. 16 (the fourth embodiment). Even in this case, one of the two phase compensating sections 231 and 231B can be mainly used for the target compensation and the other can be used for removing the noise and the like, resulting in obtaining more smooth feeling.

EXPLANATION OF REFERENCE NUMERALS 1 handle (steering wheel)
2 column shaft (steering shaft, handle shaft)
10, 154 torque sensor
12 vehicle speed sensor
14 steering angle sensor
20, 150 motor
30 control unit (ECU)
130 vehicle-side ECU
140 EPS-side ECU
141 assist control section
142 switching section
200 steering angle control section
210 position control section
220 velocity control section
230 target steering angle correcting section
231, 231A, 231B phase compensating section
232 dead band gain section
233 limiter

The invention claimed is:
1. An electric power steering apparatus that has a function, which switches between a manual steering control which drives a motor by a first motor current command value calculated based on at least a steering torque and an automatic steering control which drives said motor by a second motor current command value calculated at a steering angle control section so that an actual steering angle follows-up a target steering angle, comprising:
  a target steering angle correcting section that performs a calculation process for said steering torque depending on a steering state and a vehicle speed and outputs a target steering angle correction value, and
  a correction outputting section that corrects said target steering angle by using said target steering angle correction value and inputs a corrected correction target steering angle into said steering angle control section;
  wherein said target steering angle correcting section comprises:
  a phase compensating section that performs a phase lead compensation or a phase delay compensation to said steering torque based on said steering state;
  a dead band gain section that inputs a first compensation steering torque from said phase compensating section, has a dead band at a region which said first compensation steering torque is small, and outputs a second compensation steering torque which increases in a same direction as an increasing direction of said first compensation steering torque depending on said vehicle speed; and
  a limiter that limits an upper limit value and a lower limit value of said second compensation steering torque depending on said vehicle speed, and outputs said target steering angle correction value.

2. The electric power steering apparatus according to claim 1, wherein a second phase compensating section is disposed at a rear stage of said dead band gain section.

3. The electric power steering apparatus according to claim 1, wherein an output gain of said dead band gain section is smaller as said vehicle speed is higher.

4. The electric power steering apparatus according to claim 1, wherein a limit value of said limiter is smaller as said vehicle speed is higher.

5. The electric power steering apparatus according to claim 1, wherein said dead band is variably changed depending on said vehicle speed.

6. The electric power steering apparatus according to claim 1, wherein said steering state is a steering-forward maneuver or a steering-backward maneuver of a handle.

7. The electric power steering apparatus according to claim 6, wherein a judgment of said steering-forward maneuver and said steering-backward maneuver is performed based on a relationship between said actual steering angle and a motor angular velocity, or a relationship between said actual steering angle and a steering angular velocity, or a relationship between said steering torque and a steering angular velocity, or a relationship between said steering angular velocity and a deviation between said target steering angle and said actual steering angle, or a relationship between a deviation between a change rate of said target steering angle and said steering angular velocity and a deviation between said target steering angle and a steering angle.

8. The electric power steering apparatus according to claim 1, wherein said correction outputting section is an adding section.

9. An electric power steering apparatus that has a function, which switches between a manual steering control which drives a motor by a first motor current command value calculated based on at least a steering torque and an automatic steering control which drives said motor by a second motor current command value calculated at a steering angle control section so that an actual steering angle follows-up a target steering angle, comprising:
  a target steering angle correcting section that performs a calculation process for said steering torque depending on a steering state and a vehicle speed and outputs a target steering angle correction value; and
  a correction outputting section that corrects said target steering angle by using said target steering angle correction value and inputs a corrected correction target steering angle into said steering angle control section,
  wherein said target steering angle correcting section comprises:
  a dead band gain section that inputs said steering torque, has a dead band at a region which said steering torque is small, and outputs a first compensation steering torque which increases in a same direction as an increasing direction of said steering torque depending on said vehicle speed;
  a phase compensating section that performs a phase lead compensation or a phase delay compensation to said first compensation steering torque based on said steering state; and a limiter that limits an upper limit value and a lower limit value of a second compensation steering torque from said phase compensating section depending on said vehicle speed, and outputs said target steering angle correction value.

10. The electric power steering apparatus according to claim 9, wherein a second phase compensating section is disposed at a front stage of said dead band gain section.

11. The electric power steering apparatus according to claim 9, wherein an output gain of said dead band gain section is smaller as said vehicle speed is higher.

12. The electric power steering apparatus according to claim 9, wherein a limit value of said limiter is smaller as said vehicle speed is higher.

13. The electric power steering apparatus according to claim 9, wherein said dead band is variably changed depending on said vehicle speed.

14. The electric power steering apparatus according to claim 9, wherein said steering state is a steering-forward maneuver or a steering-backward maneuver of a handle.

15. The electric power steering apparatus according to claim 14, wherein a judgment of said steering-forward maneuver and said steering-backward maneuver is performed based on a relationship between said actual steering angle and a motor angular velocity, or a relationship between said actual steering angle and a steering angular velocity, or a relationship between said steering torque and a steering angular velocity, or a relationship between said steering angular velocity and a deviation between said target steering angle and said actual steering angle, or a relationship between a deviation between a change rate of said target steering angle and said steering angular velocity and a deviation between said target steering angle and a steering angle.

16. The electric power steering apparatus according to claim 9, wherein said correction outputting section is an adding section.

* * * * *